US010527752B2

(12) United States Patent
Fox et al.

(10) Patent No.: US 10,527,752 B2
(45) Date of Patent: Jan. 7, 2020

(54) BEHIND PIPE EVALUATION TECHNIQUES FOR WELL ABANDONMENT AND COMPLEX ANNULAR ENVIRONMENTS

(71) Applicant: Halliburton Energy Services, Inc., Houston, TX (US)

(72) Inventors: Philip Fox, Covington, LA (US); Fnu Suparman, Katy, TX (US); Gary James Frisch, Houston, TX (US); John Douglas Lauchner, Broussard, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/900,739

(22) PCT Filed: Sep. 2, 2015

(86) PCT No.: PCT/US2015/048016
§ 371 (c)(1),
(2) Date: Dec. 22, 2015

(87) PCT Pub. No.: WO2016/040062
PCT Pub. Date: Mar. 17, 2016

(65) Prior Publication Data
US 2016/0202387 A1 Jul. 14, 2016

Related U.S. Application Data

(60) Provisional application No. 62/048,636, filed on Sep. 10, 2014.

(51) Int. Cl.
*G01V 11/00* (2006.01)
*E21B 47/00* (2012.01)
*G01V 5/14* (2006.01)

(52) U.S. Cl.
CPC ............ *G01V 11/002* (2013.01); *E21B 47/00* (2013.01); *E21B 47/0005* (2013.01); *G01V 5/14* (2013.01); *G01V 11/00* (2013.01)

(58) Field of Classification Search
CPC .............................. G01V 11/002; E21B 47/00
(Continued)

(56) References Cited

U.S. PATENT DOCUMENTS

| 5,763,773 A | 6/1998 | Birchak et al. |
| 2004/0256101 A1 | 12/2004 | Fox et al. |

(Continued)

FOREIGN PATENT DOCUMENTS

WO 2011133421 A2 10/2011

OTHER PUBLICATIONS

International Search Report and Written Opinion for PCT/US2015/048016 dated Dec. 9, 2015.
(Continued)

*Primary Examiner* — Justin Seo
*Assistant Examiner* — Rodney T Frank
(74) *Attorney, Agent, or Firm* — Benjamin Fite; C. Tumey Law Group PLLC

(57) ABSTRACT

A method includes introducing a tool string into a wellbore having annular material disposed in an annulus defined between casing and the wellbore. Obtaining acoustic refracted waveform measurements of the annular material from a cement bond logging tool, obtaining ultrasonic measurements of the annular material from a circumferential acoustic scanning tool, obtaining gamma radiation measurements scattered from the annular material from a spectral density logging tool, and obtaining thermal neutron radiation measurements scattered from the annular material from a dual spaced neutron logging tool. Obtained measurements may then be collected and computed with a computer and a (Continued)

deliverable is generated that includes one or more cross plots providing a compositional equivalent of the annular material.

23 Claims, 5 Drawing Sheets

(58) Field of Classification Search
USPC .................................................... 73/152.02
See application file for complete search history.

(56) References Cited

U.S. PATENT DOCUMENTS

2005/0067160 A1   3/2005   Jacobson
2011/0240302 A1   10/2011  Coludrovich, III
2012/0075953 A1   3/2012   Chace et al.

OTHER PUBLICATIONS

Extended European Search Report from European Patent Application No. 15840473.1, dated Jan. 31, 2018, 8 pages.

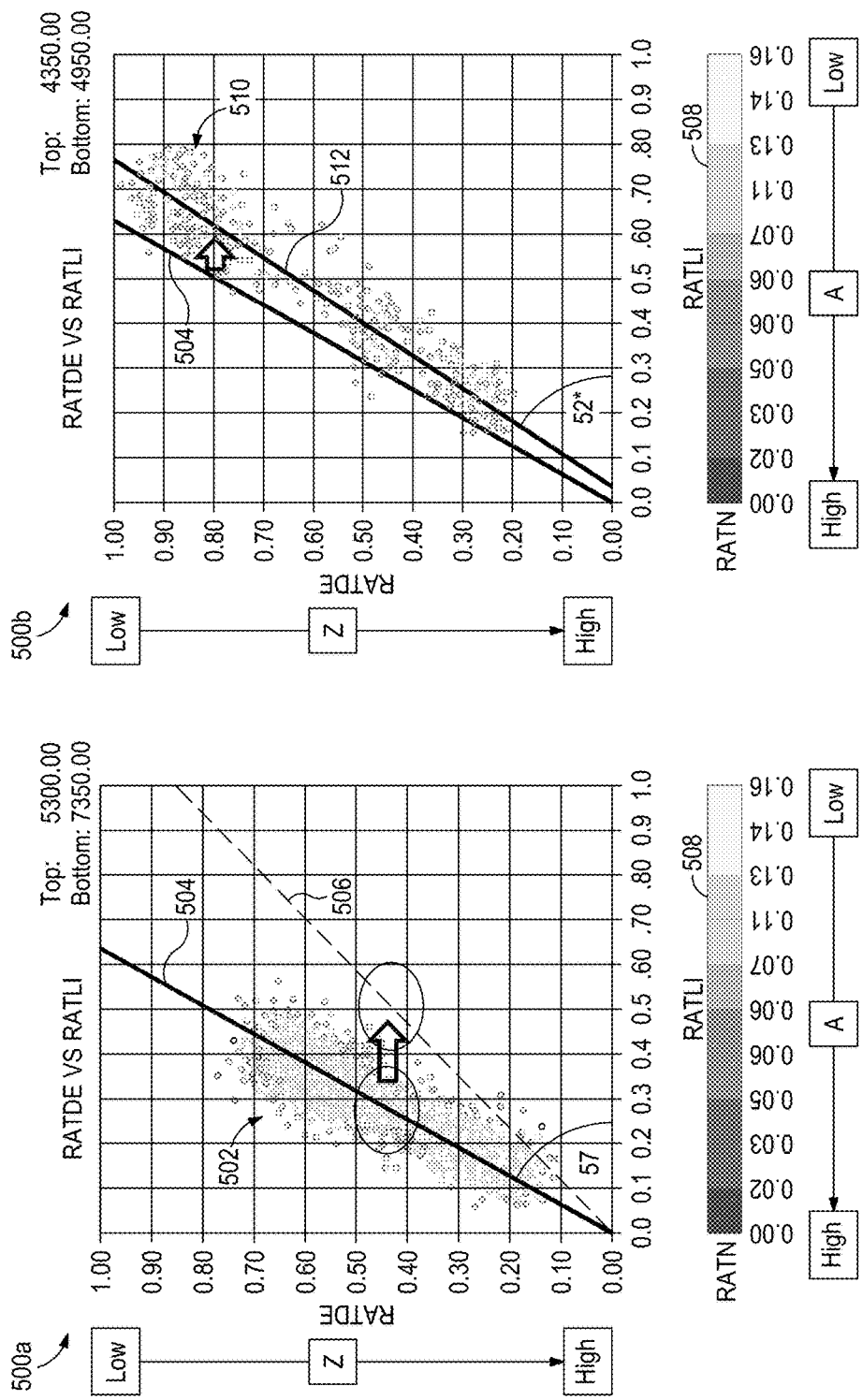

BEHIND PIPE EVALUATION TECHNIQUES FOR WELL ABANDONMENT AND COMPLEX ANNULAR ENVIRONMENTS

CROSS-REFERENCE TO RELATED APPLICATIONS

The present application is related and claims priority to U.S. Provisional Patent App. Ser. No. 62/048,636, filed on Sep. 10, 2014.

BACKGROUND

In the oil and gas industry, after drilling a wellbore it is common practice to line the wellbore with one or more strings of pipe known in the industry as "casing," and secure the casing in the wellbore with cement pumped into the annulus defined between the casing and the wall of the wellbore. In some cases, two or more strings of casing are concentrically positioned in the wellbore and cement is pumped in between the casings and the wellbore annulus to secure the casings within the wellbore.

Good cement bonding characterization between the casing and the wellbore, and also the location and distribution of other classes of materials and their characterization, is essential and particularly critical in the case of plug and abandonment operations. For instance, accurately characterizing the materials or substances disposed within the annulus, and determining their azimuthal and depth distributions throughout the wellbore may help an operator determine a preferred location to cut the casing so that upper portions of the casing may be pulled out of the wellbore. More particularly, determining the azimuthal and depth location of particular materials present within the annulus may help determine where the casing is relatively "free," or has little resistance to being extracted (pulled) from the well after it is excised from lower. It is also desirable to estimate the forces required to extract cut casing when portions of the casing are covered entirely or in part by solids and/or gelled materials that increase the friction existing between the casing and materials in the annulus.

Past methods to accomplish this include using data acquired from cement bond logging tools, such as omnidirectional or sectored/segmented logging tools, and ultrasonic measurement tools. Cement bond logging tools and ultrasonic measurement tools, however, are unable to make accurate determinations of the presence of certain substances in the wellbore annulus, such as settled drilling fluid ("mud") solids. Over a period of years from the initial completion of the well to the time of well abandonment, drilling fluids left in place in the wellbore annulus deteriorate and precipitate the suspended weighting materials, which often accumulate between concentric or overlapping layers of casing. These solids can act as a binding agent that makes it harder to extract cut casing above a cutting depth.

By relying only on acoustic measurements, the identification of such solids is often inaccurate, if not impossible. This is because acoustic sensor readings for such solids fail to provide significant contrast to adjacent materials present in the wellbore annulus at a suitable level sufficient for identification purposes. This often results in the incorrect determination of the character of materials within the annulus and, therefore, a resulting miscalculation of optimal or feasible cutting forces required to extract the casing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 5A and 5B are exemplary cross plots depicting RATDE v. RATLI for responses obtained by the spectral density logging tool of FIGS. 2 and 3A.

DETAILED DESCRIPTION

The present disclosure is related to wellbore intervention operations for the oil and gas industry and, more particularly, to methods of characterizing materials disposed within the wellbore annulus and thereby evaluating bond integrity between wellbore casing and cement that secures the casing within the wellbore.

The presently described methods provide a more robust description of materials within the annular region between a casing and a wellbore and/or between overlapping casings. The presently described methods also allow phase description distinguishing between solid, liquid, settled mud solids (i.e., barite) and gas components, if present. The methods described herein may prove advantageous in providing a more accurate annular region characterization and a prediction of cutting depth estimated from a historically optimized model based on previous log measurements and modeled applied rig tension profiling. As will be appreciated, this may allow a well operator to better plan rig operations and manage expenses and forecasting activities.

The presently disclosed methods expand on earlier industry methods by adding density and neutron measurements to the legacy acoustic and ultrasonic measurements and data interpretation to predict annular contents and target depth estimations for cutting and extracting wellbore casing. Newly developed ratios of far and near density energy windows allow characterization of the density and lithology portions as well as other portions of the spectrum measured by the density tool for phase evaluation whereas previous industry practice was to use computed bulk density (RHOB) and photoelectric (PE) computed results for open hole (without and prior to placement of wellbore casing(s)) formation evaluation. Moreover, using the using the methods described herein, the hydrogen index may be observed from the ratio of far to near neutron count rates, thereby highlighting annular character rather than the legacy neutron porosity (NPHI) derived from a transform based on near to far count rate ratios.

Figure 1:
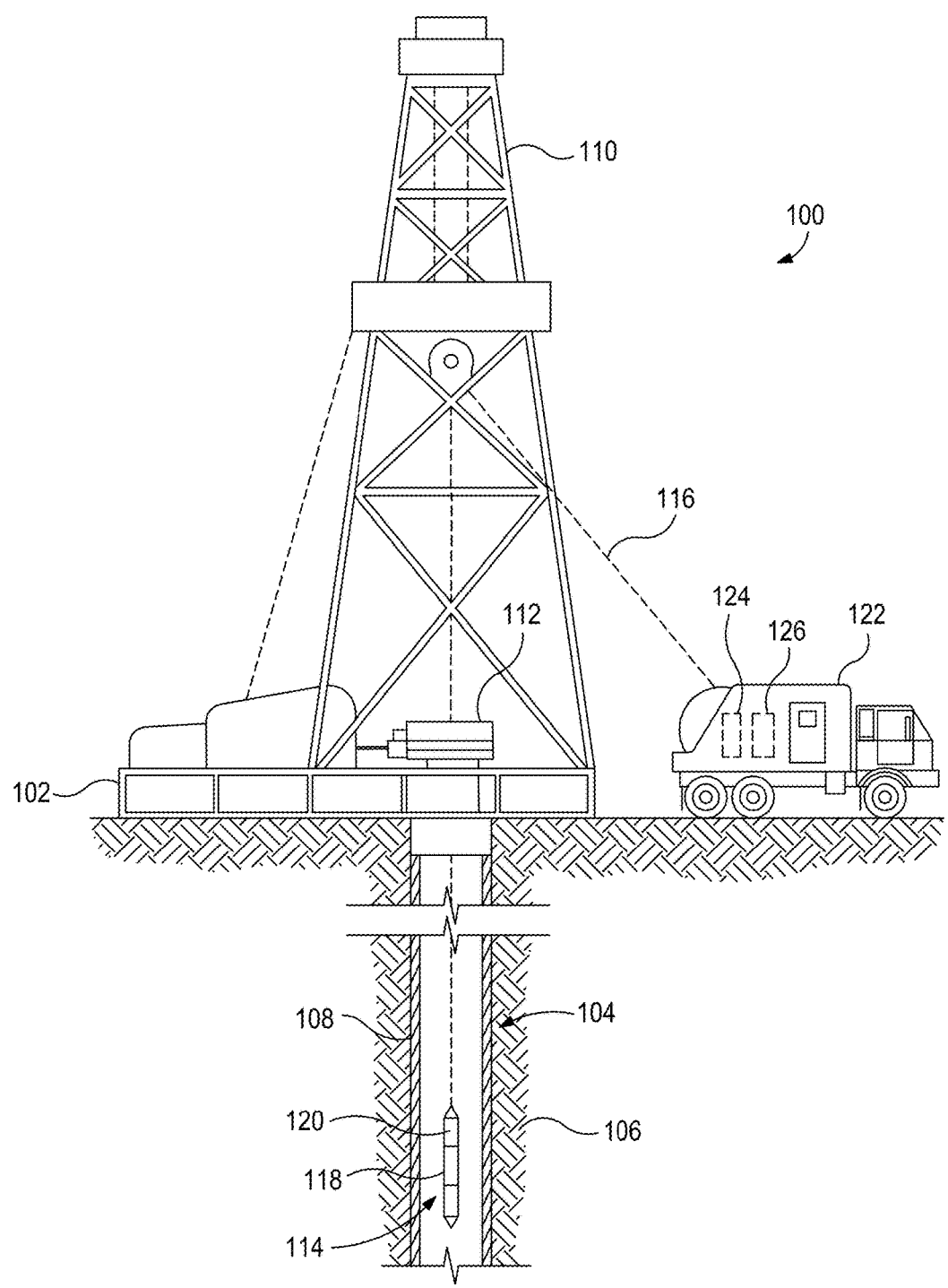
FIG. 1 is a schematic diagram of an exemplary wellbore logging system that may employ the principles of the present disclosure.

FIG. 1 is a schematic diagram of an exemplary wellbore logging system 100 that may employ the principles of the present disclosure, according to one or more embodiments. As illustrated, the wellbore logging system 100 may include a surface platform 102 positioned at the earth's surface and a wellbore 104 that extends from the surface platform 102 into one or more subterranean formations 106. In other embodiments, such as in offshore operations, a volume of water may separate the surface platform 102 and the wellbore 104. The wellbore 104 may be lined with one or more strings of casing 108 and secured in place with cement. In some embodiments, portions of the wellbore 104 may have only one casing 108 secured therein, but other portions of the wellbore 104 may be lined with two or more strings of casing 108 that overlap each other or are concentrically positioned. The casings 108 may be made of plain carbon steel, stainless steel, or another material capable of withstanding a variety of forces, such as collapse, burst, and tensile failure.

The wellbore logging system 100 may include a derrick 110 supported by the surface platform 102 and a wellhead installation 112 positioned at the top of the wellbore 104. A tool string 114, which may alternatively be referred to as a "sonde," may be suspended into the wellbore 104 on a cable 116. The tool string 114 may include multiple sensors or logging tools 118 used to analyze the bond integrity between the casing 108 and the cement or other material that bonds the casing 108 to the wellbore 104. More particularly, the logging tools 118 may be configured to detect the presence of a gas, a liquid, a settled mud solid (i.e. barite), cement, or any combination of the foregoing materials at any depth in the wellbore 104 at the interface between the casing 108 and the cement. The logging tools 118 may include, but are not limited to, a cement bond logging tool, a circumferential acoustic scanning tool, a spectral density logging tool, and a dual spaced neutron logging tool. Those skilled in the art will readily appreciate that the logging tools 118 may be expanded to include other known sensors, or those developed in the future with suitable application, without departing from the scope of the disclosure.

The tool string 114 may also include a communication module 120 having an uplink communication device, a downlink communication device, a data transmitter, and a data receiver. Conductors in the cable 116 provide power to the logging tools 118 and communicably couple the logging tools 118 to a logging facility 122 situated at a surface location. In the illustrated embodiment, the logging facility 122 is depicted as a truck, but could alternatively be another type of computing facility commonly used in the art. The logging facility 122 may include a surface communication module 124 and a surface computer 126. The surface communication module 124 may include an uplink communication device, a downlink communication device, a data transmitter, and a data receiver. The surface computer 126 may comprise any suitable type of processing logic and may include a logging display and one or more recording devices. The surface computer 126 comprises processing logic (e.g., one or more processors) and has access to software (e.g., stored on any suitable computer-readable medium housed within or coupled to the computer 126) and/or input interfaces that enable the computer 126 to perform, assisted or unassisted, one or more of the methods and techniques described herein. In operation, the logging facility 122 may collect measurements from the logging tools 118 via the communication modules 120, 124, and the surface computer 126 may control, process, store, and/or visualize the measurements gathered by the logging tools 118.

In some embodiments, processing logic (e.g., one or more processors) and storage (e.g., any suitable computer-readable medium) may be disposed downhole within the tool string 114 and may be used either in lieu of the surface computer 126 or in addition thereto. In such embodiments, memory housed within the tool string 114 may store data (such as that obtained from the logging operations described herein), which may be downloaded and processed using the surface computer 126 or other suitable processing logic once the tool string 114 has been raised to the surface. In some embodiments, processing logic housed within the tool string 114 may process at least some of the data stored in the memory within the tool string 114 before the tool string 114 is raised to the surface.

Figure 2:
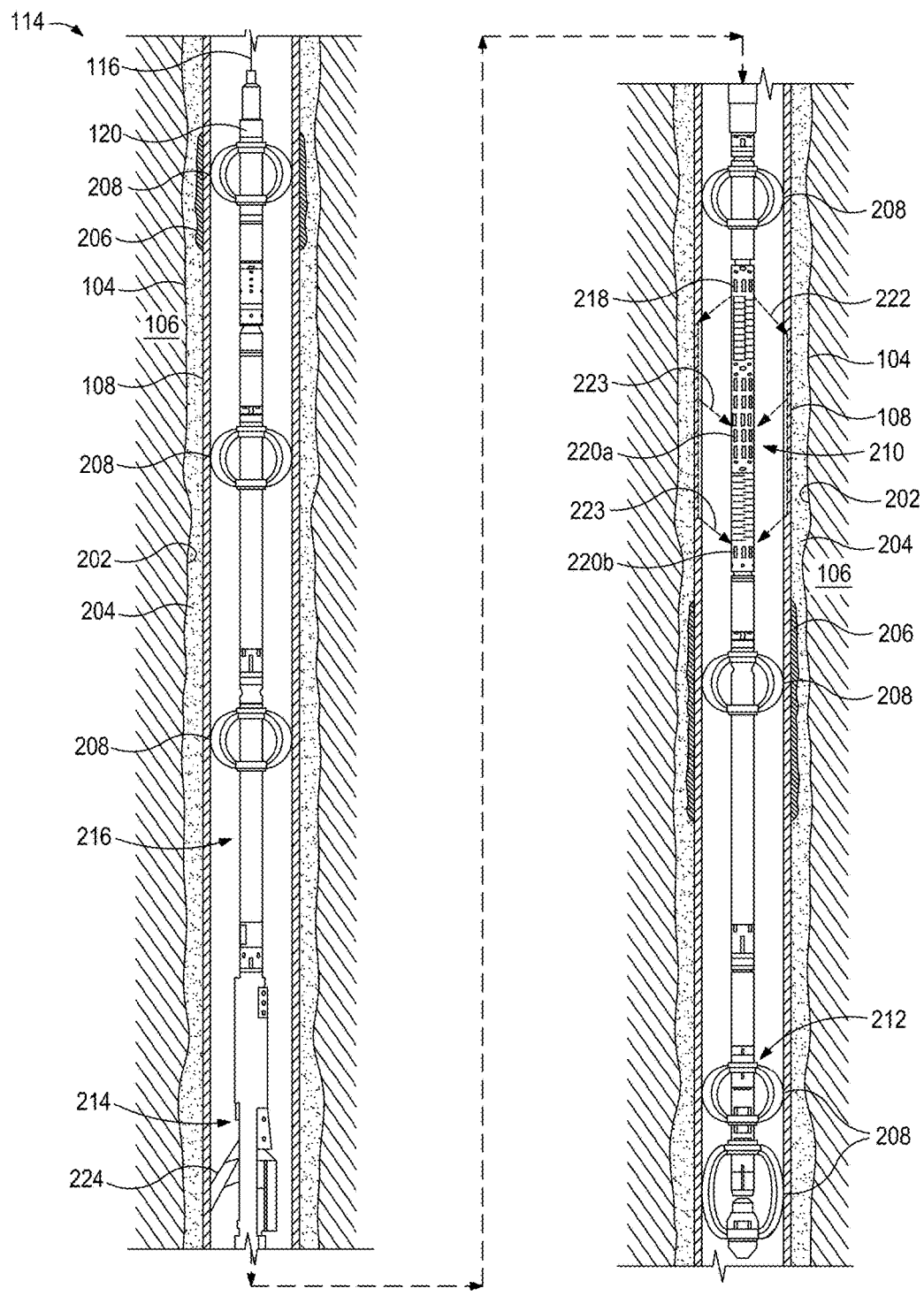
FIG. 2 depicts an enlarged view of an exemplary embodiment of the tool string of FIG. 1.

FIG. 2 depicts an enlarged view of an exemplary embodiment of the tool string 114 of FIG. 1. As illustrated, the tool string 114 is conveyed on the cable 116 into the wellbore 104, which penetrates the surrounding subterranean formation 106 and is lined with the casing 108. An annulus 202 defined between the casing 108 and the wall of the wellbore 104 may be filled with cement 204 and/or other materials that secure or bond the casing 108 within the wellbore 104. As mentioned above, more than one string of casing 108 may be secured within the wellbore 104, such as two or more strings of casing 108 that overlap each other or are otherwise concentrically positioned.

Along most portions of the wellbore 104, the casing 108 may be properly bonded to the cement 204 or other materials at the interface between the two components. In some locations, however, the bond between the casing 108 and the cement 204 or other materials may be poor or may fail over time and it may be desired to analyze annular materials 206 disposed within the annulus 106 to determine whether or not the bond between the casing 108 and the cement 204 remains intact. According to embodiments of the present disclosure, the logging tools 118 (FIG. 1) included in the tool string 114 may be used to determine a compositional equivalent for the annular material 206 disposed in the annulus 202 and thereby determine axial locations along the wellbore 104 where the casing 108 may or may not be properly bonded to the cement or other materials 204.

As used herein, the term "compositional equivalent" refers a category to which the annular material 206 can be assigned and can include a gas, a liquid, a settled mud solid (i.e. barite), or cement. Accordingly, while depicted in FIG. 2 as separate from the cement 204, in some cases, the annular material 206 may comprise a portion of the cement 204, thereby indicating that the bond between the casing 108 and the cement 204 remains intact. If, however, the compositional equivalent of the annular material 206 is one of a gas, a liquid, or a settled mud solid, it may be ascertained that the bond between the casing 108 and the cement 204 has failed at that location. Likewise, materials other than the cement 204 may have accumulated in intervals previously not isolated by the cement 204 or in un-bonded portions of the annulus 106. This may create bonded intervals beyond the originally cemented portions of the well.

As the tool string 114 traverses the wellbore 104, one or more centralizers 208 may operate to centralize the tool string 114 within the wellbore 104. The centralizers 208 may comprise, for example, leaf spring or bow spring centralizers, but could alternatively be any other type of downhole tool centralizing device. In other embodiments, however, it may be desired to have all or a portion of the tool string 114 decentralized or eccentered in the wellbore 104 such that a desired standoff from the casing 108 is achieved for measurement optimizations. In such embodiments, the centralizers 208 may be omitted or may alternatively be actuatable so that the tool string 114 may be selectively placed at desired radial distances from the casing 108.

As mentioned above, the tool string 114 may include a plurality of logging tools 118 (FIG. 1), which may include, but are not limited to, a cement bond logging tool 210, a circumferential acoustic scanning tool 212, and at least two nuclear tools shown as a spectral density logging tool 214 and a dual spaced neutron tool 216. As also mentioned above, the logging tools 118 may be expanded to include other known sensors such as, but not limited to, an epithermal neutron sensor, a rotating gamma-density sensor, a pulsed neutron sensor, an advanced acoustic logging tool with multiple excitation abilities (monopole, dipole, quadrapole, multi-pole), elemental capture gamma ray sensors or the like, without departing from the scope of the disclosure. During operation within the wellbore 104, each of the logging tools 210, 212, 214, 216 may be configured to obtain measurements that help determine the compositional equivalent for the annular material 206, whether it be cement 204 or one of a gas, a liquid, a settled mud solid, or any combination of thereof.

The cement bond logging tool 210 may comprise an omni-directional and sectored/segmented logging tool configured to provide acoustic refracted waveform measurements. In some embodiments, the cement bond logging tool 210 may operate as a pitch-and-catch transducer. More particularly, the cement bond logging tool 210 may include a source transmitter 218 and two or more detectors 220a and 220b, which may be arranged in a pitch and catch configuration. That is, the source transmitter 218 may act as a pitch transducer, and the detectors 220a,b may act as near and far catch transducers spaced at suitable near and far axial distances from the source transmitter 218, respectively. In such a configuration, the source transmitter 218 emits sonic or ultrasonic waves 222 while the near and far detectors 220a,b receive acoustic refracted waveforms 223 after reflection from fluid in the wellbore 104, the casing 108, the cement 204, and the formation 106 and record the received waveforms 223 as time domain waveforms. Because the distance between the near and far detectors 220a,b is known, differences between the refracted waveforms 223 received at each detector 220a,b provides information about attenuation that can be correlated to the annular material 206 in the annulus 202, and they allow a circumferential depth of investigation around the wellbore 104.

The pitch-catch transducer pairing may have different frequency, spacing, and/or angular orientations based on environmental effects and/or tool design. For example, if the source transmitter 218 and the detectors 220a and 220b operate in the sonic range, spacing that ranges from three to fifteen feet may be appropriate. If, however, the source transmitter 218 and the detectors 220a and 220b operate in the ultrasonic range, the spacing may be reduced.

In addition or as an alternative to the pitch-and-catch configuration of the source transmitter 218 and the detectors 220a and 220b, the cement bond logging tool 210 may also include a pulsed echo ultrasonic transducer (not expressly shown). The pulsed echo ultrasonic transducer may, for instance, operate at a frequency from 80 kHz up to 800 kHz. The optimal transducer frequency is a function of the casing 108 size, weight, mud environment and other conditions. The pulsed echo ultrasonic transducer transmits waves, receives the same waves after they reflect off the casing 108, materials in the annulus 202, and the formation 106, and records the waves as time-domain waveforms.

The use of sonic, pulsed echo ultrasonic, and pitch and catch waveforms have historically been used to evaluate the annulus 202 for the presence of cement 204 (a cement sheath) or a lack thereof. The sonic waveforms 222 use the amplitude of the first arrival, attenuation of the refracted waveforms 223 using multiple the near and far detectors 220a,b, and a recorded waveform to determine the amount of cement 204. The pulsed echo ultrasonic and pitch and catch waveforms are processed using various methods to determine the impedance of the materials in the annulus 202, and evaluation of the impedance data may be used to help determine the distribution and compositional equivalent of the annular material 206 over the circumferential exterior surface of the casing 108 within the annulus 202. It will be appreciated, however, that evaluating the annular material 206 may not be limited to the above-described methods, but may alternatively include other proprietary techniques based on tool design and methodology.

The standard sonic, pulsed echo ultrasonic, and pitch and catch waveforms may be processed by referencing the peaks and troughs of the waveforms to help characterize the annular material 206 in the annulus 202. Such processing and analysis is sometimes referred to as peak analysis for cement evaluation (PACE). Waveforms have a completely different signature when the annulus 202 is filled with a fluid (i.e., free pipe or casing 108) or a solid (i.e., cement 204), and variations associated with other materials, such as drilling muds and settled mud solids. The free pipe signature, for instance, generally exhibits higher amplitudes, a low rate of attenuation and a consistent waveform response. When the annulus 202 is filled with a solid material, however, such as the cement 204, the amplitude of the waveform is reduced, the attenuation of the same waveform is increased, and the waveforms are not consistent. PACE evaluates the peaks and troughs of these waveforms using a standard methodology for various acoustic measurement systems with different types of waveforms.

More specifically, this new technique uses the peaks and troughs of the waveform for analysis and a derivative process is subsequently used to determine the peaks and troughs. Locations where the derivative changes sign corresponds to the peak or trough of that waveform, and the value of the waveform will be called a peak. This provides an automatic method of picking both the positive and negative peaks of the entire waveform. The next step is to take the absolute value of each peak. At that point, it is possible to start seeing some general trends in the data of each waveform, and various groupings or sections appear. It is also possible to stack these waveforms to highlight these groupings.

Using the above sequence of steps, various patterns begin to emerge from both the free and bonded sections of the wellbore 104. There are four or more distinct areas (regions) or breaks in the waveform response and can be sorted or studied based on these breaks. Each area or break can be adjusted or shifted based on the waveform response, casing size, casing weight, cement properties, and other environmental conditions of the well.

It is apparent that the first region is the casing 108 arrivals, while the fifth region constitute arrivals derived from the formation 106. The other regions encompass the area between the casing 108 and the formation 106 (i.e., the annulus 202). The second and fourth regions, for example, appear to be influenced by the casing 108 and the formation 106, respectively, and can be analyzed at a future time. The third region may also be influenced by the surrounding regions, but by what effect is not necessarily clear. This grouping of regions may be a function of environmental and tool conditions, but has been recognized by both the standard cement bond log and the radial bond cement bond log, which operate at different frequencies.

Once the regions are selected, the area under each waveform for each region is determined. The area of the first region is calculated without using the first positive peak. This is due to the fact that the first positive peak is always smaller than subsequent peaks, and so removing this naturally low peak allows easier comparison to the other areas. These areas are then normalized to 100% free pipe and color-coded to allow easier viewing. This is somewhat similar to using the amplitude of waveforms to determine bonding, but multiple peaks are used instead of using a single cycle.

The circumferential acoustic scanning tool 212 may obtain ultrasonic measurements of the annular material 206 by using a rotating transducer to emit high-frequency acoustic pulses that are reflected from fluid in the wellbore 104, the casing 108, the cement 204, and the formation 106. The transducer senses the reflected pulses, and an associated logging system measures and records reflected pulse amplitude and two-way travel time. These data can be processed to produce detailed visual images of the casing 108, the cement 204, and beyond. Suitable tools that may be used as the circumferential acoustic scanning tool 212 include, but are not limited to, the line of circumferential acoustic scanning tools (CAST) available from Halliburton Energy Services of Houston, Tex. (e.g., CAST-I™, CAST-V™, CAST-M™, CAST-XR™, FASTCAST™, etc.).

The spectral density logging tool 214 may comprise a type of nuclear logging tool. In some embodiments, as illustrated, the spectral density logging tool 214 may include one or more actuatable arms 224 that may be selectively extended to move associated measurement sensors or detectors from a closed pad position to varying eccentric positions within the wellbore 104. As will be appreciated, this allows multiple depths of radial measurement within the wellbore 104, which is especially beneficial in evaluating wells that contain multiple concentric strings of casing 108. It is also easy to configure individual sensors in eccentric or decentralized configurations for specific geometries or customized situations. In the illustrated embodiment, the actuatable arm(s) 224 are extended to place the sensors or detectors of the spectral density logging tool 214 in direct engagement with the inner wall of the casing 108, or retracted when the density tool is in the "pad-closed" position.

Figure 3A:
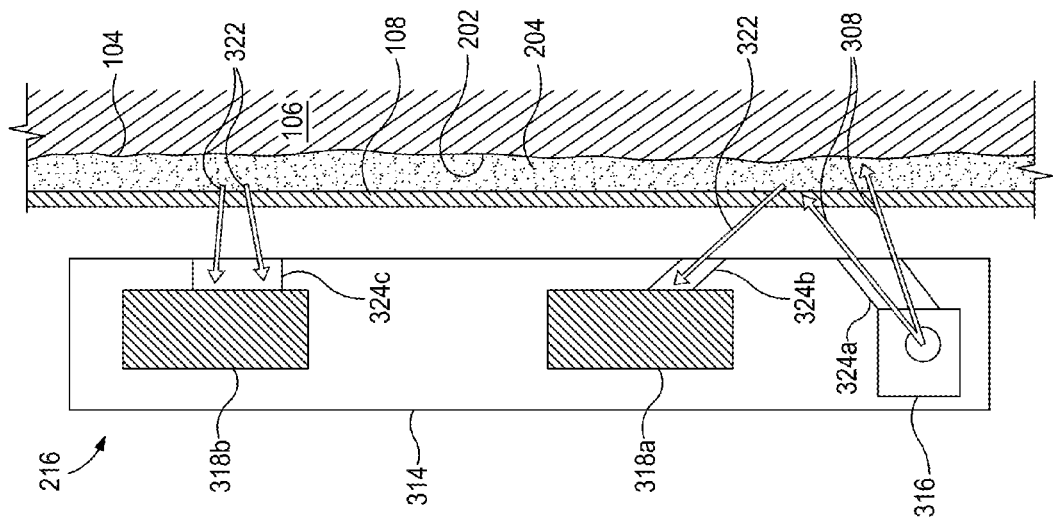
FIGS. 3A and 3B are schematic side-views of exemplary embodiments of the spectral density logging tool and the dual spaced neutron tool, respectively, of FIG. 2.

FIG. 3A depicts a schematic side-view of an exemplary embodiment of the spectral density logging tool 214 within the wellbore 104. As illustrated, the spectral density logging tool 214 is engaged against the inner wall of the casing 108, such as through the use of the actuatable arms 224 (FIG. 2), but could alternatively be radially offset from the casing 108, without departing from the scope of the disclosure. An objective measurement of the materials within the annulus 202 can be achieved by controlling the gap (i.e., standoff distance) between the face of the spectral density logging tool 214 and the inner wall of the casing 108.

The spectral density logging tool 214 may include a housing 302 that contains a radioactive source 304, a near density detector 306a, and a far density detector 306b axially spaced from each other within the housing 302 such that the near density detector 306a axially interposes the radioactive source 304 and the far density detector 306b. The radioactive source 304, which may comprise cesium-137 (Cs-137), emits gamma rays 308 toward the casing 108, the cement 204, and the formation 106 to determine near and far detector count rates in various portions of the measured spectrum and can thereby derive bulk density and photoelectric absorption of materials in its path. The near and far density detectors 306a,b are configured to detect gamma radiation 310 scattered back from the casing 108, the materials within the annulus 202 (e.g., the annular material 206 of FIG. 2), and the formation 106.

Detection of the gamma radiation 310 may be by way of measuring a count rate of photons as a function of energy. As the gamma rays 308 travel from the radioactive source 304, they are attenuated by the structures and materials in their paths and reach the near and far density detectors 306a,b as gamma radiation 310. The attenuation is a function of the electron densities as well as the photoelectric absorption properties of those structures and materials. Real-time analysis of the energy spectrum of the detected gamma radiation 310 may reveal bulk density and photoelectric absorption of the casing 108, the materials within the annulus 202 (e.g., the annular material 206 of FIG. 2), and the formation 106.

In some embodiments, gamma-density measurements may be obtained by the spectral density logging tool 214 using a rotating fixture that allows circumferential measurements around the wellbore 104 as the tool string 114 (FIG. 2) is axially moved therein. In one application, this may be accomplished by rotating the radioactive source 304 while the near and far density detectors 306a,b (or an array of multiple detectors) are fixed within the housing 302. In another application, this may be accomplished by rotating a plurality of radioactive sources 304 and measuring the gamma radiation 310 with a single density detector 306 or an array of multiple density detectors 306.

In some embodiments, the radioactive source 304 and the near and far density detectors 306a,b may each be coupled to collimators 312 (shown as collimators 312a, 312b, and 312c). The first collimator 312a coupled to the radioactive source 304 directs the emitted gamma rays 308 in a preferred path, and the second and third collimators 312b,c coupled to the near and far detectors density 306a,b, respectively, narrow the gamma radiation 310 being detected. Each of the collimators 312a-c are optional components of the spectral density logging tool 214.

Figure 3B:
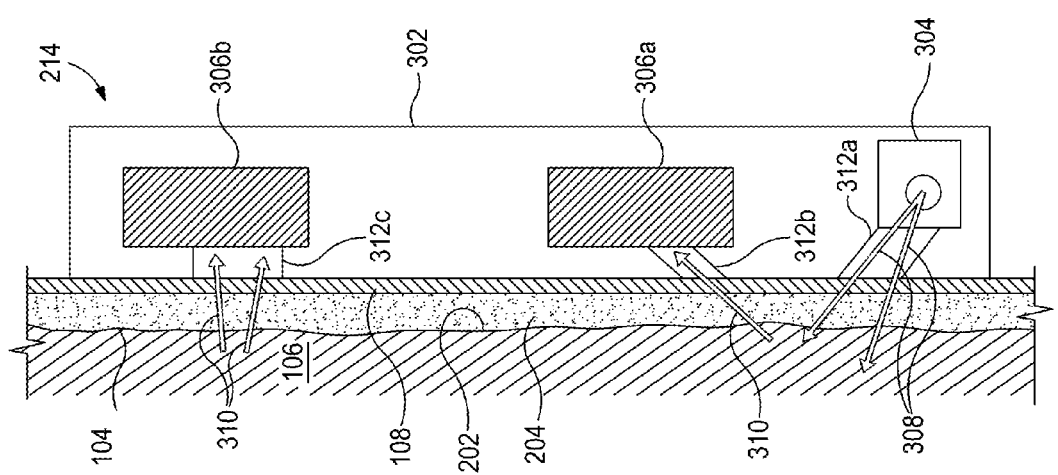

FIG. 3B depicts a schematic side-view of an exemplary embodiment of the dual spaced neutron tool 216 of FIG. 2 as arranged within the wellbore 104. Similar to the spectral density logging tool 214, an objective measurement of the materials within the annulus 202 can be achieved by achieved by controlling the gap (i.e., standoff distance) between the face of the dual spaced neutron tool 216 and the inner wall of the casing 108. Moreover, similar to the spectral density logging tool 214, the dual spaced neutron tool 216 may also comprise a type of nuclear logging tool. As illustrated, the dual spaced neutron tool 216 may include a housing 314 that contains a radioactive source 316, a near neutron detector 318a, and a far neutron detector 318b axially spaced from each other within the housing 314 such that the near neutron detector 318a axially interposes the radioactive source 316 and the far neutron detector 318b. The radioactive source 316, such as americium-beryllium (AmBe), bombards the casing 108, the cement 204 and any other materials contained in the annulus 106, and the formation 106 with fast neutrons 320. Fast neutrons 320 may refer to AmBe source burst neutrons with an energy of 4.6 MeV. Collisions with elements in the path of the fast neutrons 320, most notably hydrogen, reduce the energy of the fast neutrons 320 to the thermal level, thereby resulting in thermal neutron radiation 322. The intensity of the thermal neutron radiation 322 may be measured by the near and far neutron detectors 318a,b The measurement obtained by the dual spaced neutron tool 216 consists of the calibrated ratio of count rates between the far and near neutron detectors 318a,b. The count rate ratio is related to the hydrogen content in the materials penetrated by the fast neutrons 320, such as the annular materials 206 (FIG. 2) present within the annulus 202. When hydrogen is associated with liquid-filled pore space in the annulus 202, this ratio can be used to determine porosity, and when combined with other porosity measurements, neutron porosity can be used to detect the presence of formation gas and identify lithology. Likewise, the depth of investigation of the dual spaced neutron tool 216 is generally deeper than that of the spectral density logging tool 214.

Similar to the spectral density logging tool 214, in some embodiments, the radioactive source 316 and the near and far neutron detectors 318,b may each be coupled to collimators 324 (shown as collimators 324a, 324b, and 324c). The first collimator 234 coupled to the radioactive source 316 directs the emitted fast neutrons 320 in a preferred path, and the second and third collimators 314b,c coupled to the near and far neutron detectors 318a,b, respectively, narrow the thermal neutron radiation 322 being detected. Each of the collimators 324a-c are optional components of the dual spaced neutron tool 216.

The methods and analyses presented herein may use response ratios derived from the spectral density logging tool 214 and the dual spaced neutron tool 216 and generate cross plots and continuous depth-based log presentations that may be analyzed in determining the compositional equivalent for the annular material 206 (FIG. 2). As described above, compositional equivalents may be categorized compositions or substances similar to the annular material 206, and may include, but are not limited to, a gas, a liquid, a settled mud solid, or the cement 204. If the analysis described herein indicates that the annular material 206 is a settled mud solid, for example, that may be an indication that the annular material 206 comprises drilling fluid weighted with barite, or alternatively drilling fluid weighted with another weighting agent, such as hematite, calcium carbonate, ilmenite, sand, etc. Accordingly, the compositional equivalent does not positively identify an exact composition of the annular material 206, but rather identifies the annular material 206 as a general type or category of composition.

Examples of an annular material 206 that may be categorized as a gas compositional equivalent may include, but are not limited to, air, natural gas, and the like. Examples of a annular material 206 that may be categorized as a liquid compositional equivalent may include, but are not limited to, water, brines, an emulsion, oil, an alkane, an olefin, an aromatic organic compound, a cyclic alkane, a paraffin, a diesel fluid, a mineral oil, a desulfurized hydrogenated kerosene, and the like.

As will be appreciated, identifying the compositional equivalent of the annular material 206 may help a well operator determine a preferred location where the casing 108 might be cut to minimize friction during a cut and pull operation for the casing 108. At the top of the cement 204 there are generally layers of cement, settled mud solids, liquids, and gases. Accordingly, the cutting depth is preferably as close to the top of cement 204 as possible so that the maximum length of the casing 108 can be recovered while minimizing frictional forces caused by bonds between the casing 108, the cement 204 and other materials disposed behind the casing 108 within the annulus 106. The analyses and methods described herein for identifying the compositional equivalent of the annular material 206 may provide a better estimation of the cutting depth to enhance the efficacy and efficiency of cut and pull operations.

In some embodiments, the raw count rates for the near and far density detectors 306a,b and the near and far neutron detectors 318a,b may be used in identifying the compositional equivalent of the annular material 206. In other embodiments, however, the near and far density detectors 306a,b and the near and far neutron detectors 318a,b may be calibrated against a common standard to obtain calibrated count rates. Since every logging tool is slightly different and every radioactive source exhibits a different strength, uncalibrated tools will result in different readings from each logging tool. Additionally, there can be detector efficiencies that differ from one logging instrument to another.

For instance, there are differences in the radioactive sources 304, 316 (FIGS. 3A-3B) used in the spectral density logging tool 214 (e.g., Cs-137) and the dual spaced neutron tool 216 (e.g., AmBe) as used on different log acquisitions and at individual well locations where these services are being conducted. Calibrating the count rates of the near and far density detectors 306a,b and the near and far neutron detectors 318a,b, however, provides a uniform baseline for comparison between surveys and allows a more uniform focus on the environmental conditions of the wellbore 104 (FIGS. 2 and 3A-3B) and a characterization of the annular material 206, including its phase. Calibrating the count rates makes all detection rates uniform, even though different radioactive sources 304, 316 may be used.

This is shown in the following study, which compared two different tools (i.e., Tool 1 and Tool 2) using two radioactive sources (i.e., Source 1 and Source 2). In the study, Tools 1 and 2 were spectral density logging tools having the same design and configurations. It will be appreciated, however, that the study is equally applicable to using dual spaced neutron tools, without departing from the scope of the disclosure.

Tables 1A-1C below show raw count rate responses derived from measurements taken on a magnesium (Mg) material and an aluminum (Al) material. Spectral responses were measured for multiple windows, shown as N_BAR (near detector barite), N_DEN (near detector density), N_PEA (near detector peak), N_LITH (near detector lithology), F_BAR (far detector barite), F_DEN (far detector density), F_PEA (far detector peak), and F_LITH (far detector lithology). In each table, the Tools 1 and 2 were zeroed to background (Bkg) noise, to start testing at a common point. Table 1A shows raw count rate responses for Tool 1 using Source 1, Table 1B shows raw count rate responses for Tool 1 using Source 2, and Table 1C shows raw count rate responses for Tool 2 using Source 2.

TABLE 1A

| | Tool 1 with Source 1 | | | | | | | |
|---|---|---|---|---|---|---|---|---|
| | N BAR | N DEN | N PEA | N LITH | F BAR | F DEN | F PEA | F LITH |
| Bkg | 829.0 | 280.1 | 123.3 | 150.3 | 463.0 | 180.0 | 71.7 | 74.6 |
| Mg | 11347.4 | 8027.7 | 4866.1 | 5016.3 | 12944.7 | 12479.3 | 7671.6 | 4869.3 |
| Al | 9336.0 | 6198.1 | 4002.9 | 4017.0 | 3171.1 | 2863.5 | 1721.5 | 1167.4 |

TABLE 1B

Tool 2 with Source 1

|  | N BAR | N DEN | N PEA | N LITH | F BAR | F DEN | F PEA | F LITH |
|---|---|---|---|---|---|---|---|---|
| Bkg | 924.4 | 305.2 | 133.1 | 162.6 | 627.9 | 246.0 | 96.8 | 101.8 |
| Mg | 11774.0 | 7859.7 | 4597.1 | 4650.8 | 13335.3 | 12478.7 | 7356.1 | 4304.5 |
| Al | 9756.1 | 6130.8 | 3798.5 | 3737.0 | 3411.8 | 2920.8 | 1673.4 | 1061.9 |

TABLE 1C

Tool 2 with Source 2

|  | N BAR | N DEN | N PEA | N LITH | F BAR | F DEN | F PEA | F LITH |
|---|---|---|---|---|---|---|---|---|
| Bkg | 932.2 | 306.8 | 133.3 | 164.4 | 636.7 | 243.5 | 96.1 | 100.4 |
| Mg | 10681.3 | 7129.5 | 4177.8 | 4233.9 | 12084.1 | 11365.6 | 6708.8 | 3965.4 |
| Al | 8893.0 | 5569.1 | 3451.0 | 3406.6 | 3149.9 | 2664.3 | 1523.7 | 973.6 |

As can be seen in Tables 1A-1C, although measuring the same materials (Mg or Al), using different tools having the same design and configuration and using similar or different radioactive sources results in raw count rate responses that are slightly different.

Tables 2A-2C below show count rate responses after calibration, according to embodiments of the present disclosure. In particular, Table 2A shows calibrated count rate responses for Tool 1 using Source 1, Table 2B shows calibrated count rate responses for Tool 1 using Source 2, and Table 2C shows calibrated count rate responses for Tool 2 using Source 2.

TABLE 2A

Tool 1 with Source 1

|  | N BAR | N DEN | N PEA | N LITH | F BAR | F DEN | F PEA | F LITH |
|---|---|---|---|---|---|---|---|---|
| Mg | 12799.4 | 9306.5 | 5536.9 | 5410.3 | 13365.6 | 13068.1 | 7777.3 | 4548.3 |
| Al | 10101.1 | 6957.1 | 4419.5 | 4227.7 | 2772.3 | 2697.5 | 1595.5 | 993.4 |

TABLE 2B

Tool 2 with Source 1

|  | N BAR | N DEN | N PEA | N LITH | F BAR | F DEN | F PEA | F LITH |
|---|---|---|---|---|---|---|---|---|
| Mg | 12799.7 | 9306.5 | 5538.8 | 5411.5 | 13362.4 | 13070.3 | 7777.8 | 4548.1 |
| Al | 10101.3 | 6957.1 | 4421.1 | 4228.6 | 2771.7 | 2697.9 | 1595.6 | 993.4 |

TABLE 2C

Tool 2 with Source 2

|  | N BAR | N DEN | N PEA | N LITH | F BAR | F DEN | F PEA | F LITH |
|---|---|---|---|---|---|---|---|---|
| Mg | 12799.6 | 9306.4 | 5535.9 | 5410.3 | 13369 | 13076.5 | 7778.1 | 4546.6 |
| Al | 10101.3 | 6957 | 4418.8 | 4227.7 | 2772.9 | 2699 | 1595.7 | 993.1 |

As can be seen in Tables 2A-2C, calibrating the count rates allows each tool with multiple radioactive sources to yield substantially similar count rate responses, and in any combination.

Accordingly, embodiments of the present disclosure may utilize calibrated near and far density detector 306a,b count rates as well as calibrated near and far neutron detector 318a,b count rates and ratios of same in various forms. This enhancement allows a normalization and equal comparison of all logging tools of a particular design to be compared on a similar basis, as well providing consistent results between different generations of logging tools and variable radioactive source strengths and detector efficiencies. Such embodiments differ from previous density measurement methods, which commonly rely on the industry standard bulk density (RHOB) based on raw count rates for the near and far density detectors 306a,b. Such embodiments also differ from previous neutron measurement methods, which commonly rely on the industry standard neutron porosity (NPHI) based on raw count rates for the near and far neutron detectors 318a,b. Accordingly, using calibrated counts may prove advantageous in generalizing responses, which are not dependent on tool model or advancement of similar tools.

Figure 4:
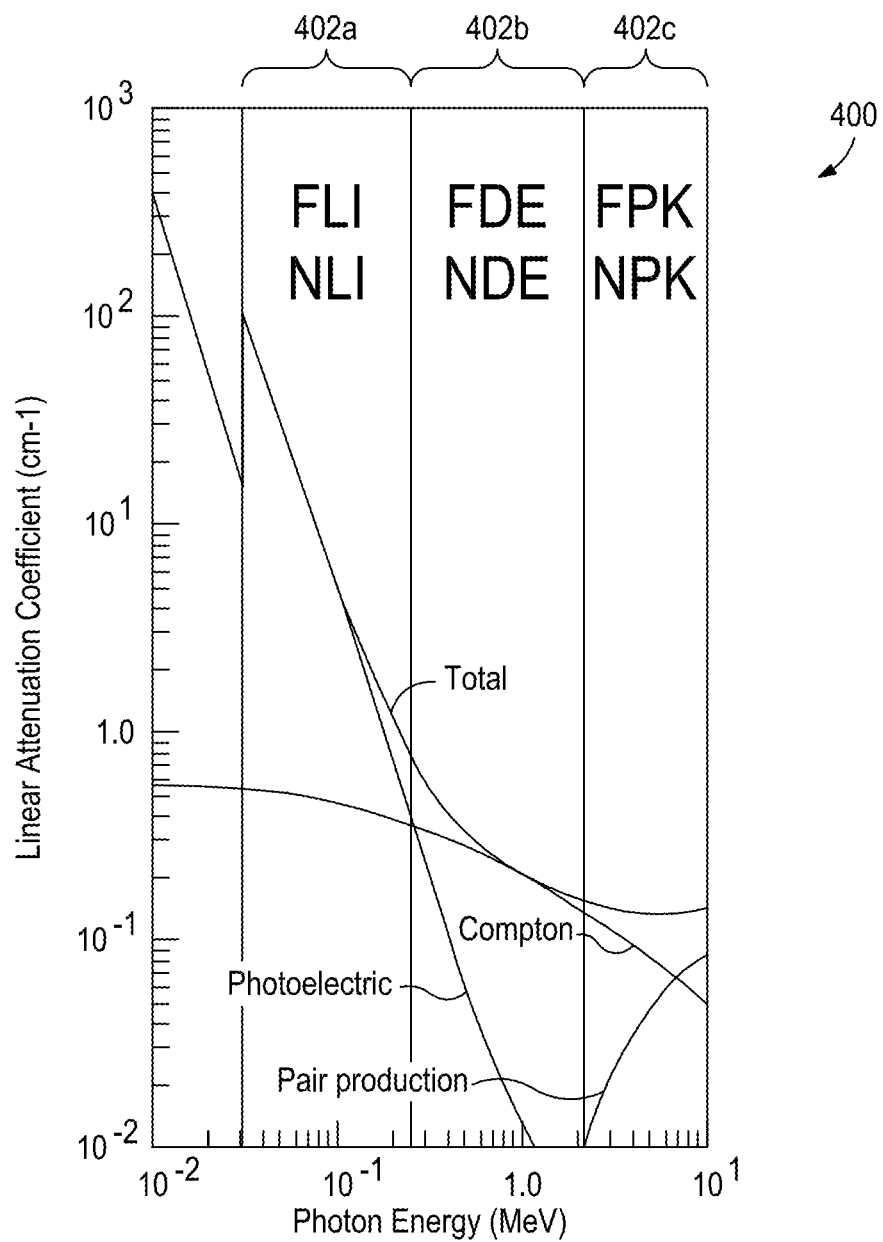
FIG. 4 is a graph depicting sample count rate windows for the spectral density logging tool of FIGS. 2 and 3A.

FIG. 4 is a graph 400 depicting sample count rate windows for the spectral density logging tool 214 of FIGS. 2 and 3A, according to one or more embodiments. More particularly, the graph 400 is separated into a lithology window 402a, a density window 402b, a peak window 402c, and a barite window (not shown). The near and far density detectors 306a,b of the spectral density logging tool 214 measure the energy level of the gamma radiation 310 (FIG. 3A) and the measured responses are separated or 'gated' into one of the windows 402a-c based on the intensity of the measured gamma radiation 310.

The lithology window 402a correlates to photoelectric responses obtained from the near density detector 306a (NLI) and the far density detector 306b (FLI), where the lithology near counts range between zero counts per second (cps) and 2000 cps, and the lithology far counts range between zero cps and 1000 cps. The density window 402b correlates to bulk density responses obtained from the near density detector 306a (NDE) and the far density detector (FDE), where the density near counts range between zero cps and 5000 cps, and the density far counts range from zero cps to 2500 cps.

While not shown, the graph 400 may further include a barite window, which correlates to responses from the near density detector 306a (NBA) and the far density detector 306b (FBA). In some embodiments, a distinct identification of barite or barite-like material may be determined with a ratio of far barite and peak windows (FBA/FPK) as compared to the density computed. The determination of barite material can be used in cross plotting other ratio counts from other spectral windows, such as barite or peak spectra windows, besides using a lithology ratio window, as explained above. In such embodiments, the cross plots discussed herein (RATDE vs RATLI), can replace RATLI with RATPK or RATBA, without departing from the scope of the disclosure.

The responses obtained by the near density detector 306a generally come from the region of the wellbore 104 (FIGS. 2 and 3A) dominated by liquids. Accordingly, evaluation methods may use the responses obtained by the near density detector 306a as a borehole fluid response indicator in interpretation efforts. On the other hand, the responses obtained by the far density detector 306b may extend deeper through the casing 108 (FIGS. 2 and 3A) and the space occupied by the annulus 202 (FIGS. 2 and 3A), along with some effects emanating from the formation 106 (FIGS. 2 and 3A).

The ratio of the calibrated counts for the near and far density detectors 306a,b can be grouped into clusters by density response (FDE/NDE) characteristics (i.e., grouping high density to low density), thereby rendering a density ratio RATDE. Similarly, the ratio of the calibrated counts for the near and far density detectors 306a,b can be grouped into clusters by lithology response (FLI/NLI) characteristics (i.e., grouping high density to low density), thereby rendering a lithology ratio RATLI. As will be appreciated, such groupings can lead to determining the phase of the annular material 206 (FIG. 2), whether it be a solid, a liquid, or a gas.

FIG. 5A is an exemplary cross plot 500a depicting RATDE v. RATLI for responses obtained by the spectral density logging tool 214 of FIGS. 2 and 3A, according to one or more embodiments. More particularly, the X-axis of the cross plot 500a provides the lithology ratio RATLI=FLI/NLI on a scale from 0.0 to 1.0, and the Y-axis provides the density ratio RATDE=FDE/NDE also on a scale from 0.0 to 1.0. The scale on the X-axis is representative of the atomic number (A) of the compositional equivalent of the annular material 206 (FIG. 2) and the scale on the Y-axis is representative of the atomic weight (Z) of the compositional equivalent of the annular material 206.

The plot 500a provides a plurality of clustered density and lithology responses 502 from the near and far density detectors 306a,b (FIG. 3A) with a ratio scaling of far to near counts at 2:1. The responses 502 may result from the spectral density logging tool 214 measuring Z/A responses obtained from the annular material 206 of FIG. 2. Table 3 provides a listing of various common elements found in earth rock or otherwise in wellbore logging operations and their corresponding Z/A ratios. Accordingly, referencing Table 3 in view of the plot 500a may allow a user to identify one or more compositional equivalents for the annular material 206.

TABLE 3

| Element | Identifier | Ratio Z/A |
|---|---|---|
| Silicon | $^{14}Si^{28.09}$ | 28.09/14 = 2.006 |
| Calcium | $^{0}Ca^{40.08}$ | 40.08/20 = 2.004 |
| Magnesium | $^{12}Mg^{24.31}$ | 24.31/12 = 2.026 |
| Potassium | $^{19}K^{39.2}$ | 39.20/19 = 2.063 |
| Aluminum | $^{13}Al^{26.98}$ | 26.98/13 = 2.075 |
| Chlorine | $^{17}Cl^{35.45}$ | 35.45/17 = 2.085 |
| Sodium | $^{11}Na^{22.99}$ | 22.99/11 = 2.090 |
| Carbon | $^{6}C^{12.01}$ | 12.01/6 = 2.001 |
| Sulfur | $^{16}S^{32.06}$ | 32.06/16 = 2.001 |
| Oxygen | $^{8}O^{15.99}$ | 15.99/8 = 1.999 |
| Iron | $^{26}Fe^{55.85}$ | 55.855/26 = 2.148 |
| Barium | $^{56}Ba^{137.33}$ | 137.33/56 = 2.452 |

A normal line 504 has been superimposed through the responses 502 and shows that the average Z/A ratio of the responses 502 is approximately 2. Accordingly, by referencing the compositions shown in Table 3, the Z/A compositional equivalent of the annular material 206 (FIG. 2) falls in the range of liquids and gases. If, however, the normal line 504 fell closer to 2.4, such as is shown by the dashed normal line 506, the Z/A compositional equivalent for the annular material 206 would be closer to barium or a variation thereof, such as barite, as shown in Table 3. Likewise, count rate ratio of near-to-far for density window or lithology were use in the open hole logging to quantify density in gram/cc units and lithology in photoelectric in barn/electron units. The counts ratio of near-to-far windows, or portions of the spectral density measurement, as well as ratios of various far windows, or portions of the spectral density measurement can be combined to allow characterization of the annular material 206 behind the casing 108 within the wellbore 104.

In some embodiments, response ratios from the dual spaced neutron tool 216 may also be used to help determine and otherwise refine the compositional equivalent of the annular material 206 (FIG. 2). More particularly, a ratio (RATN) of calibrated far neutron detector 318b count rates (FDSN) and calibrated near neutron detector 318a count rates (NDSN) may be used to determine a relative hydrogen index for the environment of the wellbore 104 (FIG. 2). The near neutron detector 318a count rates NDSN range between zero cps and 10,000 cps and the far detector 318b count rates FDSN range between zero cps and 2000 cps, and the scaling of far to near counts of the neutron ratio RATN=FDSN/NDSN is 5:1.

The neutron ratio RATN may be graphically depicted on the plot 500a in accordance with a color- or shade-coded scale 508, which ranges from 0.0-0.16. The color or shading of the responses 502 may be indicative of the hydrogen content for the detected material. Compositions having a higher hydrogen content, for example mud, will have lower RATN on the color/shade index scale 508, while a lower hydrogen content will fall in higher RATN on the color/shade index scale 508. Cement and gas, for example, exhibit a low hydrogen index, while drilling muds and brines typically exhibit large amounts of hydrogen. Accordingly, there may be a visible correlation between the hydrogen index and the compositional equivalent of the annular material 206 (FIG. 2), such as its phase, and the color or shading of the responses 502 may provide the visual indicator on the plot 500a. The normal line 504 in the cross plot 500a is representative of a specific model of the spectral density logging tool 214, but may vary by model generation or configuration of the tool. Accordingly, utilizing calibrated counts for the generalized responses for different tool models may prove advantageous in providing more consistent responses.

FIG. 5B is another exemplary cross plot 500b depicting RATDE v. RATLI for responses obtained by the spectral density logging tool 214 of FIGS. 2 and 3A, according to one or more embodiments. The cross plot 500b is similar in some respects to the cross-plot 500a of FIG. 5A and therefore can best understood with reference thereto. The plot 500b provides a plurality of clustered density and lithology responses 510 from the near and far density detectors 306a,b (FIG. 3A). As in the plot 500a, the responses 510 may result from the spectral density logging tool 214 measuring Z/A responses obtained from the annular material 206 of FIG. 2. The plot 500b may also incorporate the neutron ratio RATN color- or shade-coded scale 508 to help determine the compositional equivalent of the annular material 206 (FIG. 2), as generally described above.

Unlike the plot 500a of FIG. 5A, however, the responses 510 were obtained while the spectral density logging tool 214 was in a decentered configuration within the wellbore 104 (FIGS. 2 and 3A), whereas the responses 502 of FIG. 5A were obtained while the spectral density logging tool 214 was centered within the wellbore 104. In at least one embodiment, for instance, the responses 510 of the graph 500b may be obtained while the spectral density logging tool 214 is in contact with the inner wall of the casing 108 (FIGS. 2 and 3A). A normal line 512 has been superimposed through the responses 510 and is offset from the normal line 504, thereby depicting a shift in measurement responses received by decentering the spectral density logging tool 214 within the wellbore 104.

As illustrated, the average Z/A ratio of the responses 510 is approximately 2.148, thereby having a Z/A compositional equivalent of the annular material 206 (FIG. 2) falling at or near iron (Fe), as shown in Table 3. As will be appreciated, this result may be expected as decentering the spectral density logging tool 214 closer to the casing 108 (FIGS. 2 and 3A) would naturally return an increased amounts of responses derived from the iron-based materials of the casing 108. In either embodiment of FIGS. 5A and 5B, however, boundary regions for data response groupings could be changed as a function of borehole mud density and cement slurry, mud, and other contents in the annulus 202 (FIGS. 2 and 3A). The counts ratio method is based on far to near ratio, and the near counts shown in the cross plots 500a,b are expected as the reference signal from the wellbore, which was mostly what was known previously regarding the properties of the fluid within the wellbore.

Log analysts using the presently described methods of interpretation and modeling may be able to generate and evaluate results before the tool string 114 (FIGS. 1 and 2) is returned to surface. Moreover, the presently disclosed methods allow distinction between cement, barite (and similar heavy mineral drilling fluid weighting materials) settled solids and drilling mud from which there is, at times, precipitated solids segregation, which previous methods relying on acoustic and ultrasonic measurement alone were not able to accurately identify.

In some embodiments, a behind pipe evaluation technique (BPET) answer product or "deliverable" may be generated and otherwise derived from the various interpreted logging tool responses discussed herein. The BPET deliverable, for example, may be computed and generated using the surface computer 126 (FIG. 1) of the logging facility 122 (FIG. 1), or with any other computing device or facility with access to the logging tool responses. The BPET results may be provided on a graphical user interface or any other format capable of displaying or providing the results for consideration. In some embodiments, the BPET deliverable may include and graphically display evaluation results taken from some or all of the cement bond logging tool 210, the circumferential acoustic scanning tool 212, the spectral density logging tool 214, and the dual spaced neutron tool 216, including the cross plots similar to those of FIGS. 5A-5B. In at least one embodiment, the BPET deliverable may further include a composite log derived from measurements obtained from the cement bond logging tool 210, the circumferential acoustic scanning tool 212, the spectral density logging tool 214, and the dual spaced neutron tool 216. The BPET deliverable may also include interpretation highlights that identify intervals of interest, historical results, and possible recommendations on proceeding, such as preferred locations to cut the casing 108 for a cut and pull operation. In some embodiments, the BPET deliverable may further include an interpretation and evaluation legend providing rig operation recommendations and solutions.

Embodiments disclosed herein include:

A. A method that includes introducing a tool string into a wellbore at least partially lined with casing, wherein an annular material is disposed in an annulus defined between the casing and the wellbore and the tool string comprises a plurality of logging tools including at least a cement bond logging tool, a circumferential acoustic scanning tool, a spectral density logging tool, and a dual spaced neutron logging tool, obtaining acoustic refracted waveform measurements of the annular material from the cement bond logging tool, obtaining ultrasonic measurements of the annular material from the circumferential acoustic scanning tool, obtaining gamma radiation measurements scattered from the annular material from the spectral density logging tool having a first radioactive source, a near density detector, and a far density detector, obtaining thermal neutron radiation measurements scattered from the annular material from the dual spaced neutron logging tool having a second radioactive source, a near neutron detector, and a far neutron detector, wherein the near and far neutron detectors obtain, collecting and computing the measurements obtained by the plurality of logging tools with a computer, and generating with the computer a deliverable that includes one or more cross plots that provide a compositional equivalent of the annular material, wherein the one or more cross-plots depict responses based on a density ratio of count rates based on density response versus a lithology ratio of count rates based on lithology response as well as other portions of measured density spectrums and ratios thereof, and a coded hydrogen index scale of the responses based on a ratio of far neutron detector and near neutron detector count rates.

B. A wellbore logging system that includes a tool string extendable within a wellbore at least partially lined with a casing, wherein an annular material is disposed in an annulus defined between the casing and the wellbore, and wherein the tool string comprises a plurality of logging tools including a cement bond logging tool that obtains acoustic refracted waveform measurements of the annular material, a circumferential acoustic scanning tool that obtains ultrasonic measurements of the annular material, a spectral density logging tool having a first radioactive source, a near density detector, and a far density detector, wherein the near and far density detectors obtain gamma radiation measurements scattered from the annular material, and a dual spaced neutron logging tool having a second radioactive source, a near neutron detector, and a far neutron detector, wherein the near and far neutron detectors obtain thermal neutron radiation measurements scattered from the annular material, a computer communicably coupled to the plurality of logging tools and including a non-transitory medium readable by a processor and storing instructions that when executed by the processor cause the computer to collect, compute, and visualize the measurements obtained by the plurality of logging tools, and a deliverable generated by the computer and including one or more cross plots that provide a compositional equivalent of the annular material, wherein the one or more cross-plots depict responses based on a density ratio of count rates for the near and far density detectors based on density response versus a lithology ratio of count rates for the near and far density detectors based on lithology response as well as other portions of measured density spectrums, and a coded hydrogen index scale of the responses based on a ratio of far neutron detector and near neutron detector count rates.

Each of embodiments A and B may have one or more of the following additional elements in any combination: Element 1: wherein the one or more cross-plots further depict at least one of a ratio of near and far windows or portions of the gamma radiation measurements, and a ratio of multiple far windows or portions of the gamma radiation measurements combined. Element 2: further comprising determining a phase of the annular material based on the ratio of near and far windows, the ratio of multiple far windows, or portions of the gamma radiation measurements. Element 3: determining a location to cut the casing based on the compositional equivalent of the annular material. Element 4: wherein the spectral density logging tool includes one or more actuatable arms, the method further comprising selectively placing the near and far density detectors at eccentric positions within the wellbore to obtain the gamma radiation measurements of various fields of measurement within the wellbore. Element 5: further comprising determining the compositional equivalent based on a ratio of atomic weight and atomic number of the compositional equivalent of the annular material. Element 6: further comprising calibrating the count rates of the near and far density detectors and the near and far neutron detectors against a common standard to obtain calibrated count rates, and using the calibrated count rates to plot the responses on the one or more cross-plots. Element 7: wherein the deliverable further includes a composite log derived from the measurements obtained from the cement bond logging tool and the circumferential acoustic scanning tool. Element 8: further comprising processing the acoustic refracted waveform measurements by referencing peaks and troughs of waveforms obtained by the cement bond logging tool. Element 9: further comprising determining a phase of the annular material based on the density and lithology ratios as well as the other measured portions of the density spectrums and their associated ratios. Element 10: further comprising optimizing a standoff distance between an inner wall of the casing and one or both of the spectral density logging tool and the dual spaced neutron logging tool.

Element 11: wherein the one or more cross-plots further depict at least one of a ratio of near and far windows or portions of the gamma radiation measurements, and a ratio of multiple far windows or portions of the gamma radiation measurements combined. Element 12: further comprising determining a phase of the annular material based on the ratio of near and far windows, the ratio of multiple far windows, or portions of the gamma radiation measurements. Element 13: wherein the casing comprises two or more strings of casing that overlap each other or are concentrically-positioned. Element 14: wherein the computer is a surface computer arranged at a surface location and the tool string is communicably coupled to the surface computer via a cable that conveys the tool string into the wellbore. Element 15: wherein the spectral density logging tool includes one or more actuatable arms that selectively place the near and far density detectors at eccentric positions within the wellbore. Element 16: wherein the compositional equivalent is determined based on a ratio of atomic weight and atomic number of the compositional equivalent of the annular material. Element 17: wherein the compositional equivalent of the annular material comprises one of a gas, a liquid, a settled mud solid, and cement. Element 18: wherein the count rates of the near and far density detectors and the near and far neutron detectors are calibrated against a common standard to obtain calibrated count rates. Element 19: wherein the deliverable further includes a composite log derived from the measurements obtained from the cement bond logging tool and the circumferential acoustic scanning tool.

By way of non-limiting example, exemplary combinations applicable to A and B include: Element 1 with Element 2; and Element 11 with Element 12.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    introducing a tool string into a wellbore at least partially lined with casing, wherein an annular material is disposed in an annulus defined between the casing and the wellbore and the tool string comprises a plurality of logging tools including at least a cement bond logging tool, a circumferential acoustic scanning tool, a spectral density logging tool, and a dual spaced neutron logging tool;
    obtaining acoustic refracted waveform measurements of the annular material from the cement bond logging tool;
    obtaining ultrasonic measurements of the annular material from the circumferential acoustic scanning tool;
    obtaining gamma radiation measurements scattered from the annular material from the spectral density logging tool having a first radioactive source, a near density detector, and a far density detector;
    obtaining thermal neutron radiation measurements scattered from the annular material from the dual spaced neutron logging tool having a second radioactive source, a near neutron detector, and a far neutron detector;
    collecting the measurements obtained by the plurality of logging tools with a computer; determining a far density count rate and a near density count rate from the gamma radiation measurements;
    determining a far neutron count rate and a near neutron count rate from the thermal neutron radiation measurements;
    determining a density ratio of the far density count rate to the near density count rate based on density response characteristics;
    determining a lithology ratio of the far density count rate to the near density count rate based on lithology response characteristics;
    determining a relative hydrogen index using a ratio of the far neutron count rate to the near neutron count rate;
    determining a compositional equivalent of the annular material using the density ratio, the lithology ratio and the relative hydrogen index, wherein the density ratio is representative of an atomic number of the compositional equivalent and the lithology ratio is representative of an atomic weight of the compositional equivalent; and
    generating with the computer a deliverable indicating a cutting depth prediction based on the determined compositional equivalent of the annular material for facilitating extraction of at least a portion of the casing from the wellbore.

2. The method of claim 1, wherein deliverable indicates at least one of:
    a ratio of near and far windows or portions of the gamma radiation measurements; and
    a ratio of multiple far windows or portions of the gamma radiation measurements combined.

3. The method of claim 2, further comprising determining a phase of the annular material based on the ratio of near and far windows, the ratio of multiple far windows, or portions of the gamma radiation measurements.

4. The method of claim 1, determining a location to cut the casing based on the compositional equivalent of the annular material.

5. The method of claim 1, wherein the spectral density logging tool includes one or more actuatable arms, the method further comprising selectively placing the near and far density detectors at eccentric positions within the wellbore to obtain the gamma radiation measurements of various fields of measurement within the wellbore.

6. The method of claim 1, further comprising determining the compositional equivalent based on a ratio of atomic weight and atomic number of the compositional equivalent of the annular material.

7. The method of claim 1, further comprising:
    calibrating the count rates of near and far density detectors and near and far neutron detectors against a common standard to obtain calibrated count rates; and
    using the calibrated count rates to plot the responses on one or more cross-plots.

8. The method of claim 1, wherein the deliverable further includes a composite log derived from the measurements obtained from the cement bond logging tool and the circumferential acoustic scanning tool.

9. The method of claim 1, further comprising processing the acoustic refracted waveform measurements by referencing peaks and troughs of waveforms obtained by the cement bond logging tool.

10. The method of claim 1, further comprising determining a phase of the annular material based on the density and lithology ratios as well as other measured portions of the far and near density count rates and associated ratios.

11. The method of claim 1, further comprising optimizing a standoff distance between an inner wall of the casing and one or both of the spectral density logging tool and the dual spaced neutron logging tool.

12. The method of claim 1, wherein a slope of the linear relationship between the density ratio and the lithology ratio indicates a type of composition for the annular material.

13. A wellbore logging system, comprising:
    a tool string extendable within a wellbore at least partially lined with a casing, wherein an annular material is disposed in an annulus defined between the casing and the wellbore, and wherein the tool string comprises a plurality of logging tools including:
    a cement bond logging tool that obtains acoustic refracted waveform measurements of the annular material;
    a circumferential acoustic scanning tool that obtains ultrasonic measurements of the annular material;
    a spectral density logging tool having a first radioactive source, a near density detector, and a far density detector, wherein the near and far density detectors obtain gamma radiation measurements scattered from the annular material; and
    a dual spaced neutron logging tool having a second radioactive source, a near neutron detector, and a far neutron detector, wherein the near and far neutron detectors obtain thermal neutron radiation measurements scattered from the annular material; and a computer communicably coupled to the plurality of logging tools and including a non-transitory medium readable by a processor and storing instructions that, when executed by the processor, causes the computer to:

collect the measurements obtained by the plurality of logging tools;

determine a far density count rate and a near density count rate from the gamma radiation measurements;

determine a far neutron count rate and a near neutron count rate from the thermal neutron radiation measurements;

determine a density ratio of the far density count rate to the near density count rate based on density response characteristics;

determine a lithology ratio of the far density count rate to the near density count rate based on lithology response characteristics;

determine a relative hydrogen index based on a ratio of the far neutron count rate to the near neutron count rate;

determine a compositional equivalent of the annular material using the density ratio, the lithology ratio and the relative hydrogen index, wherein the density ratio is representative of an atomic number of the compositional equivalent and the lithology ratio is representative of an atomic weight of the compositional equivalent; and generate with the computer a deliverable indicating a cutting depth prediction based on the determined compositional equivalent of the annular material for facilitating extraction of at least a portion of the casing from the wellbore.

14. The wellbore logging system of claim 13, wherein the deliverable indicates at least one of:

a ratio of near and far windows or portions of the gamma radiation measurements; and a ratio of multiple far windows or portions of the gamma radiation measurements combined.

15. The wellbore logging system of claim 14, further comping determining a phase of the annular material based on the ratio of near and far windows, the ratio of multiple far windows, or portions of the gamma radiation measurements.

16. The wellbore logging system of claim 13, wherein the casing comprises two or more strings of casing that overlap each other or are concentrically-positioned.

17. The wellbore logging system of claim 13, wherein the computer is a surface computer arranged at a surface location and the tool string is communicably coupled to the surface computer via a cable that conveys the tool string into the wellbore.

18. The wellbore logging system of claim 13, wherein the spectral density logging tool includes one or more actuatable arms that selectively place the near and far density detectors at eccentric positions within the wellbore.

19. The wellbore logging system of claim 13, wherein the compositional equivalent 1s determined based on a ratio of atomic weight and atomic number of the compositional equivalent of the annular material.

20. The wellbore logging system of claim 13, wherein the compositional equivalent of the annular material comprises one of a gas, a liquid, a settled mud solid, and cement.

21. The wellbore logging system of claim 13, wherein the count rates of the near and far density detectors and the near and far neutron detectors are calibrated against a common standard to obtain calibrated count rates.

22. The wellbore logging system of claim 13, wherein the deliverable further includes a composite log derived from the measurements obtained from the cement bond logging tool and the circumferential acoustic scanning tool.

23. A wellbore logging system, comprising:

a tool string extendable within a wellbore at least partially lined with a casing, wherein an annular material is disposed in an annulus defined between the casing and the wellbore, and wherein the tool string comprises a plurality of logging tools including:

a cement bond logging tool that obtains acoustic refracted waveform measurements of the annular material;

a circumferential acoustic scanning tool that obtains ultrasonic measurements of the annular material;

a spectral density logging tool having a first radioactive source, a near density detector, and a far density detector, wherein the near and far density detectors obtain gamma radiation measurements scattered from the annular material; and a dual spaced neutron logging tool having a second radioactive source, a near neutron detector, and a far neutron detector, wherein the near and far neutron detectors obtain thermal neutron radiation measurements scattered from the annular material; and a computer communicably coupled to the plurality of logging tools and including a non-transitory medium readable by a processor and storing instructions that, when executed by the processor, causes the computer to:

collect the measurements obtained by the plurality of logging tools;

determine a far density count rate and a near density count rate from the gamma radiation measurements;

determine a far neutron count rate and a near neutron count rate from the thermal neutron radiation measurements;

determine a density ratio of the far density count rate to the near density count rate based on density response characteristics;

determine a lithology ratio of the far density count rate to the near density count rate based on lithology response characteristics;

determine a relative hydrogen index based on a ratio of the far neutron count rate to the near neutron count rate;

determine a compositional equivalent of the annular material using the density ratio, the lithology ratio and the relative hydrogen index, wherein the density ratio is representative of an atomic number of the compositional equivalent and the lithology ratio is representative of an atomic weight of the compositional equivalent; and generate with the computer a deliverable indicating a cutting depth prediction based on the determined compositional equivalent of the annular material for facilitating extraction of at least a portion of the casing from the wellbore and wherein the deliverable indicates at least one of a ratio of near and far windows or portions of the gamma radiation measurements or a ratio of multiple far windows or portions of the gamma radiation measurements combined.

* * * * *